United States Patent [19]

Gilb

[11] 3,985,459
[45] Oct. 12, 1976

[54] TRUSS RIDGE-JOINT CONNECTOR ASSEMBLY
[75] Inventor: Tyrell T. Gilb, Berkeley, Calif.
[73] Assignee: Simpson Manufacturing Co., Inc., San Leandro, Calif.
[22] Filed: Mar. 29, 1976
[21] Appl. No.: 671,375

[52] U.S. Cl. .................... 403/217; 52/639; 52/691; 52/692; 52/693; 52/696
[51] Int. Cl.² ........................................ E04C 3/292
[58] Field of Search ............ 52/692, 691, 693, 643, 52/639, 642, 758 G, 753 L, 751, 696, 753 T, 715; 85/11, 13; 403/217, 174

[56] References Cited
UNITED STATES PATENTS

| 3,330,087 | 7/1967 | Troutner | 52/751 X |
|---|---|---|---|
| 3,386,222 | 6/1968 | Troutner | 52/693 |
| 3,423,899 | 1/1969 | Demers | 52/751 X |
| 3,479,783 | 11/1969 | Jureit | 52/639 X |
| 3,531,904 | 10/1970 | Sanford | 52/693 X |
| 3,535,845 | 10/1970 | Troutner | 52/692 X |
| 3,537,224 | 11/1970 | Troutner | 52/693 |
| 3,646,725 | 3/1972 | Troutner | 52/693 X |
| 3,946,532 | 3/1976 | Gilb | 52/692 |

FOREIGN PATENTS OR APPLICATIONS

| 518,233 | 2/1940 | United Kingdom | 52/693 |

Primary Examiner—Price C. Faw, Jr.
Assistant Examiner—Leslie A. Braun
Attorney, Agent, or Firm—James R. Cypher

[57] ABSTRACT

A ridge-joint connector assembly for trusses having a top chord which consists of a pair of juxtaposed parallel wood lumber members and metal web members. The assembly connects the abutting ends of the pitched lumber members and the metal chord members. The assembly consists of two pairs of metal fastener plates, a pair of ridge end-butt inserts and an elongated metal load transfer member.

4 Claims, 8 Drawing Figures

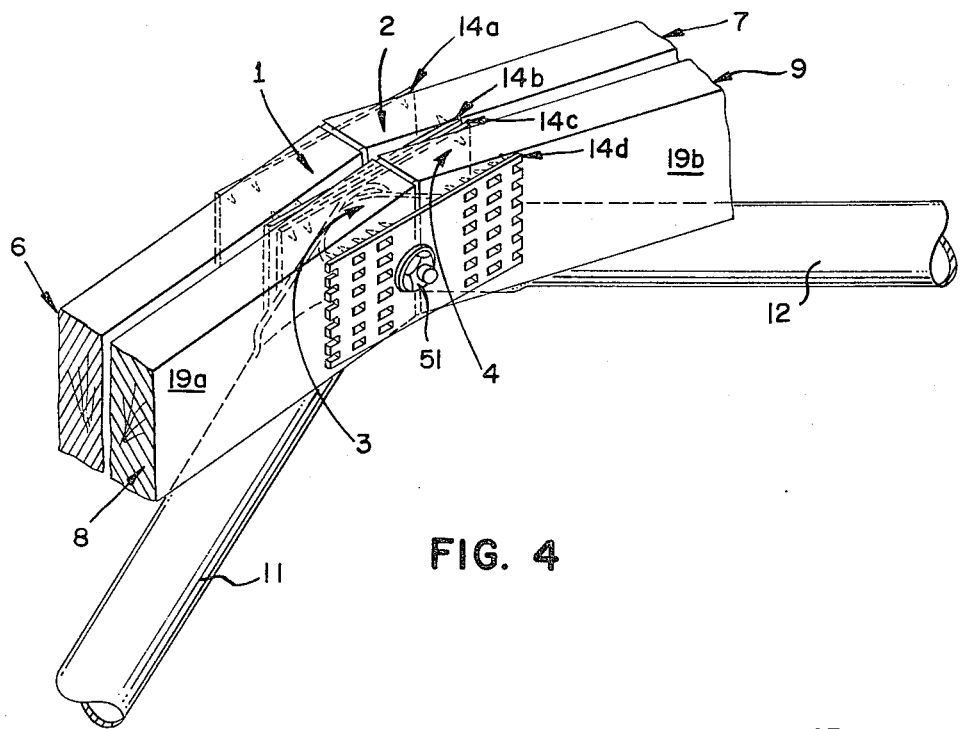
FIG. 4
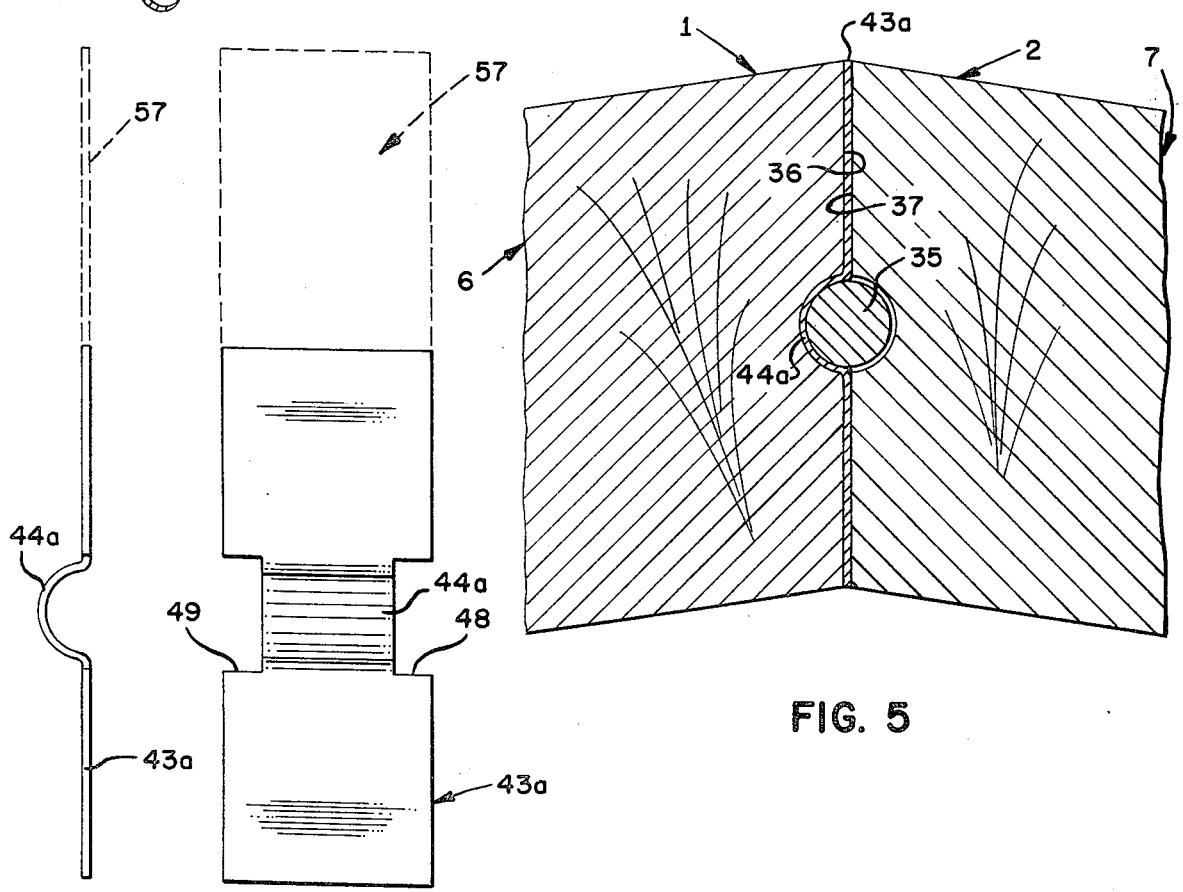
FIG. 5
FIG. 6   FIG. 7

TRUSS RIDGE-JOINT CONNECTOR ASSEMBLY

BACKGROUND OF THE INVENTION

Composite trusses constructed from metal webs and lumber top chords came into commercial usage about 17 years ago. About 20 percent of such composite strusses are pitched structural trusses and require some means for connecting the top chords at the ridge butt-joint. An example of such a composite truss and a ridge connector therefor is shown in A. L. Troutner U.S. Pat. No. 3,535,845 granted Oct. 27, 1970. The compression forces in the top chord at the ridge joint can reach exceedingly high numbers and the connector as constructed according to Troutner U.S. Pat. No. 3,535,845 imposed such high shear loads on the ridge pin that an especially large pin had to be used. Two years later, Troutner introduced another heavy duty ridge connector set forth in his U.S. Pat. No. 3,646,725 which solved the pin shear problem but the heavy cast metal product is expensive and requires careful fitting of the shortened lumber top chords to the device and still requires two pin connections adjacent the ridge joint.

On Sept. 20, 1974, Applicant filed application Ser. No. 507,943 for a new connector for a composite truss and this application will issue as U.S. Pat. No. 3,946,532 on Mar. 30, 1976. This patent relates to flat trusses and does not teach a connector for joining the butt ends of the pitched top chords.

SUMMARY OF THE INVENTION

The gist of the present invention is the use of prong plates with drawn hole openings and a ridge butt-insert plate in combination with a load transfer member which will provide a ridge joint assembly with low cost elements, some of which are similar or identical in construction to the elements in the other joint assemblies of the truss described in my previous U.S. Pat. No. 3,946,532.

A principal object is to provide a ridge joint which produces the maximum load value with the least and simplest metal elements.

An object of the present invention is to provide a ridge joint assembly which eliminates the need for special cast connectors and uses similar assembly technology and uses some similar elements as are used in the other joints of trusses constructed in accordance with the teachings of my U.S. Pat. No. 3,946,532.

A further object is to provide a ridge joint assembly which permits the ends of the lumber top chords to abutt one another; separated only by a thin sheet metal member.

Another object is to provide a ridge joint assembly which requires the removal of a minimal amount of wood from the top chord.

Still another object is to provide a connector which can be used for both 2 X 4 and 2 X 6 wood chords.

A further object is to provide a connector which distributes the compression load of the top chord members over both the butt ends as well as the side faces of the wood chord members.

Another object is to provide a connector in which the pin is so placed that it prevents the wood chords from shifting vertically in respect to each other and the pin shear occurs across the longitudinal cross section rather than across the transverse cross section as in all other ridge joint connectors.

BRIEF DESCRIPTION OF THE DRAWINGS

FIG. 4 is a perspective view of the assembly shown in FIG. 1.

FIG. 5 is an enlarged cross section taken along line 5—5 of FIG. 2.

FIG. 6 is a side view of one of the elements of the present invention as used in the assemblies shown in FIGS. 1, 2, 3, 4 and 5. The broken lines in addition to the solid lines indicate the form of the same element used in the assemblies shown in FIG. 1A.

FIG. 7 is an end view of the device shown in FIG. 6. The broken lines indicate the modification of the element for use in the assembly of FIG. 1A.

BRIEF DESCRIPTION OF THE PREFERRED EMBODIMENTS

Figure 1:
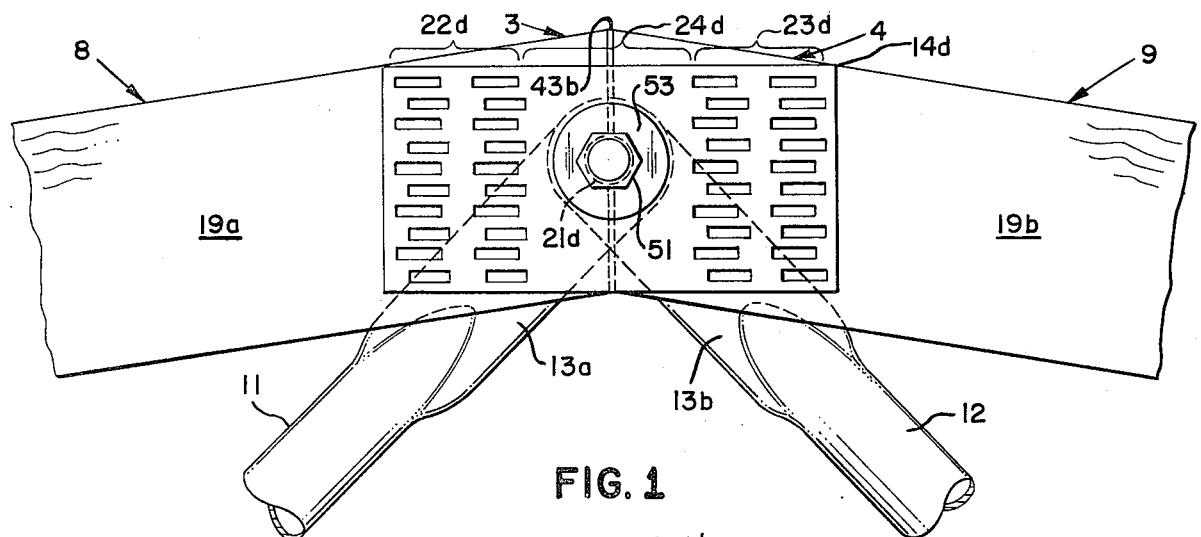
FIG. 1 is a side view of a ridge-joint connector assembly constructed in accordance with my invention using 2 X 4's for chords.

A ridge-joint connector assembly for connecting the ends 1, 2, 3 and 4 of abutting top chords 6, 7, 8 and 9 and transferring tension and compression loads between the chord members and metal web members 11 and 12 in a truss structure wherein the top chords consist of two juxtaposed pitched and parallel lumber members, and the metal web members have flattened end areas 13a and 13b interposed between the lumber members consisting briefly of the following: two pairs of continuous sheet metal fastener plates 14a, 14b, 14c and 14d positioned on the inside faces 16a and 16b and 17a and 17b and outside faces 18a and 18b and 19a and 19b of the ends of the lumber members and each plate includes an opening 21a, 21b, 21c and 21d therethrough and fastener areas 22a, 22b, 22c, 22d and 23a, 23b, 23c, and 23d on both sides of the opening and disposed from the opening leaving an area 24a, 24b, 24c and 24d around the opening free of fasteners; a plurality of sharp pointed fastener means 26a, 26b, 26c and 26d sufficient in number to transfer substantially all of the web load to the lumber members and having a length less than the width of the lumber member and connecting the fastener area of the plates to the chord by penetrating the inside and outside faces of the lumber members at a plurality of closely spaced intervals in order to reduce the possibility of failure of the lumber by splitting; the flattened ends of the metal web members are formed with openings 29a and 29b therethrough; each of the openings in the plates is surrounded by integrally formed drawn sidewalls 31a, 31b, 31c and 31d extending into the lumber members forming coaxial annular flanges 32a, 32b, 32c and 32d providing bearing area; there being enlarged counter sunk openings 33a, 33b, 33c and 33d and 34a, 34b, 34c, and 34d in the inside and outside faces of the lumber members dimensioned to receive the annular flanges of the plates in a force fit; a cylindrical elongated metal load transfer member 35 having a diameter and a length dimensioned to transfer loads between the metal fastener plates and the metal web members by bearing against a substantial portion of the metal plate flanges in a force fit, and against the edges of the openings in the metal web members; the abutting end faces 36, 37, 38 and 39 of the lumber members are formed with hemispherical grooves 41a, 41b, 42a and 42b for receiving the load transfer member; means providing lateral support for holding the members of the assembly together; a pair of ridge-end metal butt-inserts 43a and 43b each covering a substantial portion of the end of one of the abutting lumber members and spaced therebetween, and the butt-inserts have hemispherical offsets 44a and 44b formed therein dimensioned for receipt in the hemispherical groove in one of the abutting lumber members; and the web members, plates, fastener means and load transfer member are positioned so that substantially all load transference from said web members to the wood chord members occurs at the interface of the plates and the inside and outside faces of the lumber members through the plurality of sharp pointed fasteners and a portion of the load is transferred through the offset in the butt-inserts and the load transfer member.

The main loads in the ridge joint of a truss are the compression loads in the top chord lumber members. The end face of each 2 × 4 must withstand design loads of 10,000 pounds and the end face of each 2 × 6 must withstand design loads of nearly 20,000 pounds. These loads are so great that simply butting the ends of the wood members together did not give satisfactory joint load values. Interposing metal cast fixtures between the shortened lumber ends such as the Troutner cast iron connector set forth in U.S. Pat. No. 3,646,725 was unacceptable because of the cost, added weight and complicated truss fabrication problems. Instead of the $15.00 or more Troutner connector knuckle, this application uses a light weight assembly costing less than $1.00. One of the elements of the assembly is a 20 gauge sheet metal rectangle with a ¼ inch radius hemispherical bend. This ridge-butt insert is shown in FIGS. 6 and 7 and for the 2 × 4 chords, it measures a mere 1⅜ inches in width and is 3½ inches long. Before bending cutouts at 48 and 49 measure ¾ × ¼ inch. The butt-insert is placed between the angle cut lumber ends and the hemispherical bend is inserted into the hemispherical opening in the end of one of each of the abutting pairs of lumber members.

The unique feature of the present joint assembly is that all loads transmitted from the wood members to the metal web members are transferred by metal to metal contact. Part of the shear load for example, is transmitted from the hemispherical portion 44a of the butt-inserts to the bolt 35 and then directly to the openings 29a and 29b in the webs 11 and 12.

The primary feature of this invention is the use of fastener plates 14 which are fully described in my U.S. Pat. No. 3,946,532. These plates have now been standardized at 3 inches × 6 inches × 18ga. prong plates. Each plate has a ½ inch drawn hole which accepts a No. 5½ inch diameter 4¼ inch machine bolt. The plates may be used with nail fasteners but preferably the plates are formed with prongs, struck from the plate leaving elongated slots. It is essential that the prong plate have two areas of prongs and a prong free area surrounding the opening in the plate. Four rows of prongs with about 11 prongs in each row has proven sufficient.

As stated above, even though bolt 35 is inserted through the wood chord members, the bolt is almost entirely in contact with metal only so that loads are transferred from metal to metal. Loads, for example, are transferred from the sides of the wood members into the plurality of prongs in each plate. The load is transmitted through the plate to the solid prong-free portion of the plates around the openings and thence to the drawn flanges 32. The "hub effect" of the drawn opening in the plate transmits loads from the plate to the pin far in excess of the forces which could be transmitted by a plate with simply a hole cut in it. This drawn opening permits a much lighter gauge fastener plate to be used, thus effecting a great savings in metal weight and cost.

It is to be noted that 4 fastener plates are used at the ridge joint. Even though two fastener plaes as set forth in my U.S. Pat. No. 3,946,532 would often be sufficient. Because of the high compression loads in the wood chords, it is essential that the chords remain in alignment to prevent any unbalancing in the truss. The fastener plates on the inside and outside faces of the lumber members "encapsulate" them and thus prevent failure at the joint.

Another important feature of the prong plates which has been described in my prior patent, but is repeated herein, is the fact that they perform the dual function of transmitting loads while preventing splitting of the lumber members which is the main problem of composite wood chord/metal web trusses constructed in accordance with the teachings of Troutner, U.S. Pat. No. 3,646,725. Trusses using prong plates can use lower grades of lumber and less attention must be given to imperfections and knots as compared with the Troutner composite truss.

Another feature of the present ridge joint is the fact that the compression loads are distributed evenly over the faces of the abutting lumber members and evenly to the inside and outside faces of the lumber members as contrasted with the point or pin loads experienced in the Troutner ridge connectors as shown in U.S. Pat. Nos. 3,646,725 and 3,535,845. With the joint encapsulated by prong plates, misalignment is minimized and even the ability to resist torsion forces at the joint under adverse loads is present.

The joint is held together by placing a nut 51 on the threaded end of bolt 35 and 12 gauge washers 52 and 53 between the head 54 of the bolt and the nut.

As stated above, the use of the bolt in the hemispherical openings in the butt-ends of the lumber members prevents relative shifting of the abutting lumber members in the vertical plane. With the use of the butt-insert, compression of the wood fibers in the hemispherical openings due to crushing by the bolt is lessened by the spreading of the load by the hemispherical metal bend in the butt-insert.

It should be noted that the opening in the plates could be at the mid-point of the plate. For ease in calculations using the same computer assumptions for the 2 × 6 and 2 × 4 chords, the center of the hole has been placed at a point 1¾ inches from the bottom edge of the plate.

The drawings illustrate an assembly for a roof pitch 2 inches in 12 inches. Practical pitch may be from 0 to about 3 inches in 12 inches but with decreasing allowed values over 2 inches in 12 inches. In assembling the truss, it is essential that the chord angles at the butt joint be cut accurately and that the chords be tightly butted when the fastener plates are pressed into the lumber.

On Dec. 26, 1975, Testing Engineers, Inc. of Oakland, Calif. tested the ridge joint as above described and dimensioned. For test purposes, a 1 in. 6 pitch roof ridge truss was simulated. The compression load between butt-ends was imposed upon intervening ridge butt insert plates. Two assemblies, using chord simulators approximately 18 inches long were assembled as an opposed vertical pair joined together by a short length of 1 inch diameter 14 ga. tubing with standard flattened ends, each end engaging ½ inch diameter bolts. Starret gauges were mounted at each joint to read to 0.001 inch compression movement across the butt joint.

The test assembly was placed on the bed of a Baldwin Universal testing machine loads were placed on the assembly and the gauges read at increments of loading of 4000 pounds between 0 pounds and 36,000 pounds. Three tests were made and the minimum ultimate load was 61,500 pounds. Dividing by two and a safety factor of three, a minimum design ultimate load of 10,250 pounds was achieved.

Figure 1A:
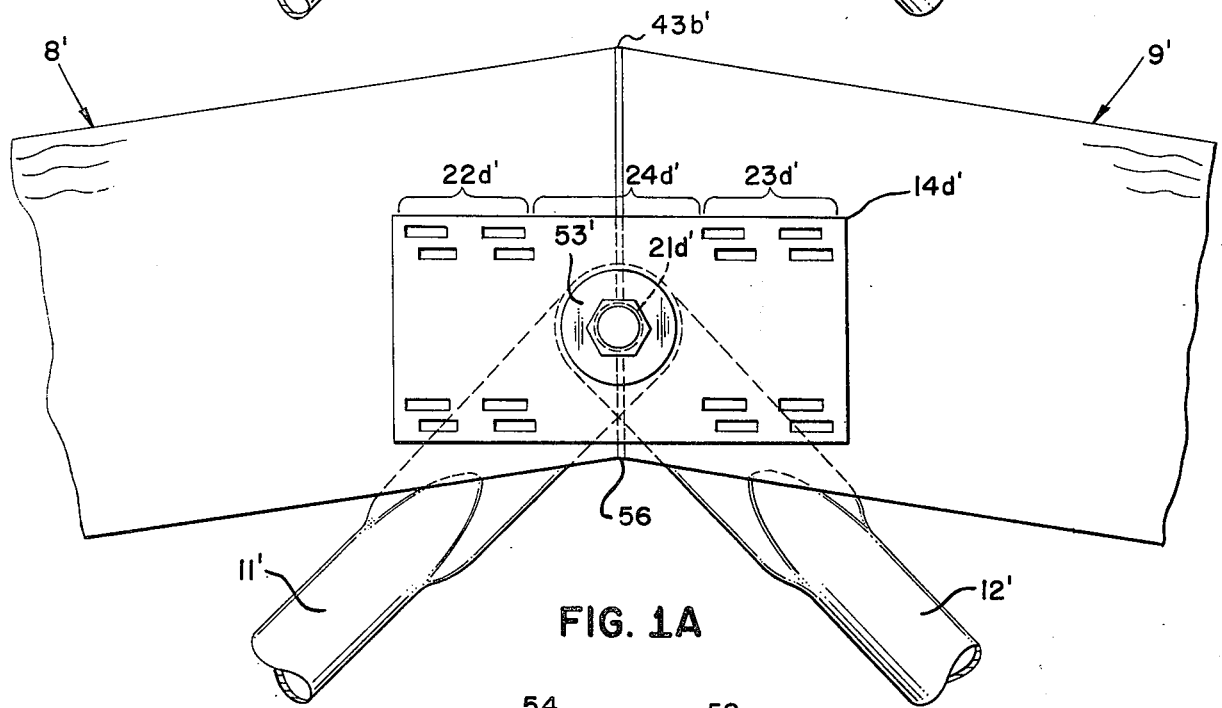
FIG. 1A is a side view of a slightly modified form of my invention using 2 X 6's for chords.
Figure 2:
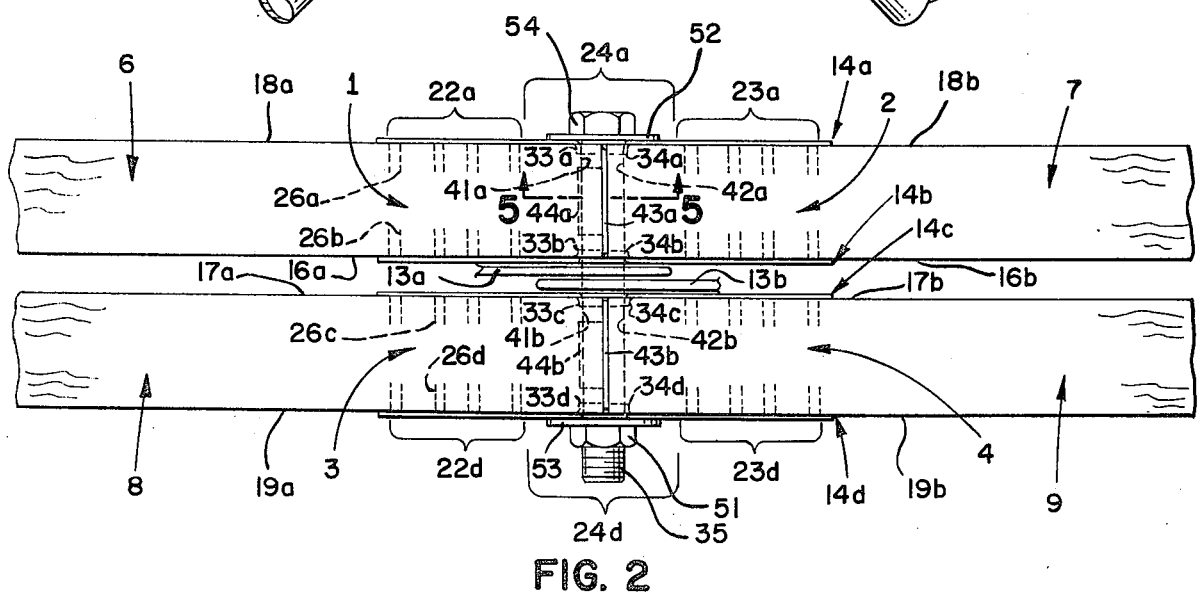
FIG. 2 is a top plan view of the assembly shown in FIG. 1.
Figure 3:
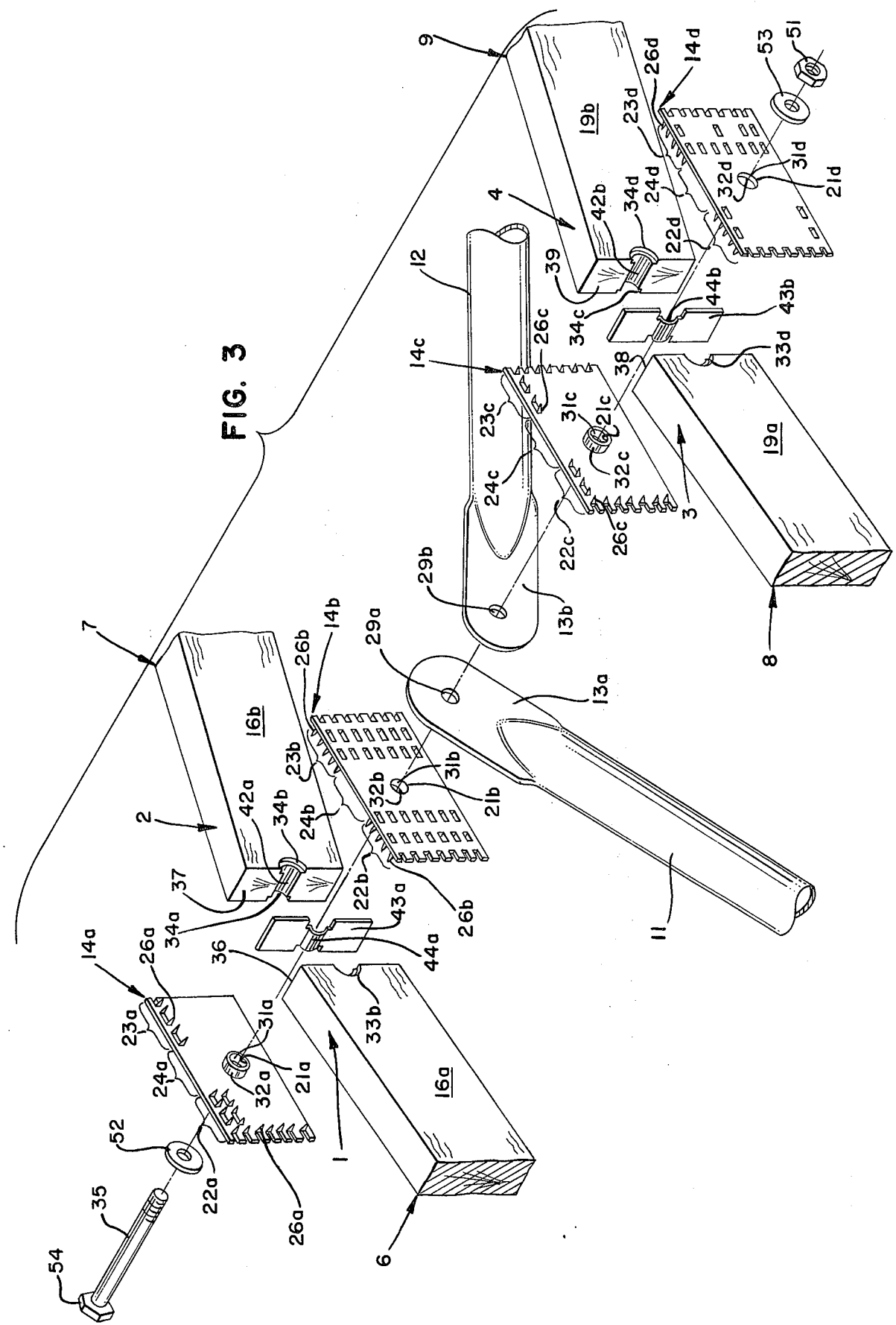
FIG. 3 is an exploded perspective view of a ridge-joint connector assembly as shown in FIG. 1.

Referring to FIG. 1A, a modified form of the invention is shown. This form of the invention is exactly the same as the previously described invention except that the double chords are 2 × 6 lumber instead of 2 × 4 lumber. Corresponding chords have been labeled 8' and 9'. The only other difference is the fact that the opening 21d' in the standard fastener plate 14d' is centered in the plate. This permits the opening center to be placed 1¾ inches above the bottom edge 56 of the intersection of the bottom chords so that for programming the computer the opening placement will be the same for the 2 × 4 and 2 × 6 chords. The fastener plate 14d' is the same as previously described with fastener areas 22d and 23d and a fastener free area 24d. To accommodate the increased area of the ends of the 2 × 6 chords, the butt-insert plate 43b' is larger in area. The dotted area 57 shown in FIGS. 6 and 7 indicate the manner in which the butt-insert plate for the 2 × 4 chords is modified to be used in the chords using 2 × 6's. FIG. 1A shows web members 11' and 12' which serve in the same manner in the truss as previously described.

A test of a joint using a pair of 2 × 6 chords was conducted by Testing Engineers, Inc. on the same date and under the same testing procedures as previously described. An ultimate load of 118,000 pounds was achieved and by dividing by 2 and by a safety factor of 3 a minimum design load of 19,666 pounds was computed.

The joint assemblies described for 2 × 4 and 2 × 6 chords are only by way of example. Lumber chords of larger or even smaller sizes are possible within the teaching of the invention.

I claim:

1. A ridge-joint connector assembly connecting the ends of abutting top chords and transferring tension and compression loads between said chord members and metal web members in a truss structure wherein said top chords consist of two juxtaposed pitched and parallel lumber members, and said metal web members have flattened end areas interposed between said lumber members comprising:
   a. Two pairs of continuous sheet metal fastener plates positioned on the inside and outside faces of the ends of said lumber members and each plate includes an opening therethrough and a fastener area on both sides of said opening and disposed from said opening leaving an area around said opening free of fasteners;
   b. a plurality of sharp pointed fastener means sufficient in number to transfer substantially all of the web load to said lumber members and having a length less than the width of said lumber member and connecting said fastener area of said plates to said chord by penetrating the inside and outside faces of said lumber members at a plurality of closely spaced intervals in order to reduce the possibility of failure of said lumber by splitting;
   c. the flattened ends of said metal web members are formed with openings therethrough;
   d. each of said openings in said plates is surrounded by integrally formed drawn sidewalls extending into said lumber members forming a coaxial annular flange providing bearing area;
   e. there being enlarged counter sunk openings in the inside and outside faces of said lumber members dimensioned to receive said annular flanges of said plates in a force fit;
   f. a cylindrical elongated metal load transfer member having a diameter and a length dimensioned to transfer loads between said metal fastener plates and said metal web members by bearing against a substantial portion of said metal plate flanges in a force fit, and against the edges of said openings in said metal web members;
   g. the abutting end faces of said lumber members are formed with hemispherical grooves for receiving said load transfer member;
   h. means providing lateral support for holding the members of said assembly together;
   i. a pair of ridge-end metal butt-inserts each covering a substantial portion of the end of one of said abutting lumber members and spaced therebetween, and said butt-inserts have a hemispherical offset formed therein dimensioned for receipt in said hemispherical groove in one of said abutting lumber members; and
   j. said web members, plates, fastener means and load transfer member are positioned so that substantially all load transference from said web members to said wood chord members occurs at the interface of said plates and the inside and outside faces of said lumber members through said plurality of sharp pointed fasteners and a portion of said load is transferred through said offset in said butt-inserts and said load transfer member.

2. In a truss structure as described in claim 1 comprising:
   a. said fastener means includes a plurality of transversely extending, sharp pointed, self-penetrating prongs integrally formed in each of said plates extending into the inside and outside faces of said lumber members a distance substantially less than the width of one of said lumber members.

3. In a ridge-joint connector assembly as described in claim 2 comprising:
   a. said prongs are struck from said sheet metal plates and leave elongated slots therein; and
   b. the inside faces of said plates present a planar bearing surface to said flattened side faces of said web members.

4. In a truss structure as described in claim 2 comprising:
   a. said load transfer member comprises a threaded bolt having an enlarged head at one end and a threaded portion at the other end, a pair of washers and a threaded nut.

* * * * *